United States Patent [19]  [11] Patent Number: 5,034,491
Wewers et al.  [45] Date of Patent: Jul. 23, 1991

[54] (METH)ACRYLATE ESTER-MODIFIED ORGANOPOLYSILOXANES

[75] Inventors: Dietmar Wewers, Bottrop; Christian Weitemeyer, Essen; Jürgen Jachmann, Herne, all of Fed. Rep. of Germany

[73] Assignee: Th. Goldschmidt AG, Essen, Fed. Rep. of Germany

[21] Appl. No.: 426,874

[22] Filed: Oct. 24, 1989

[30] Foreign Application Priority Data

Dec. 13, 1988 [DE] Fed. Rep. of Germany ....... 3841843

[51] Int. Cl.$^5$ ............................................. G08G 77/00
[52] U.S. Cl. ..................................... 528/41; 525/477; 528/26; 528/32; 528/33
[58] Field of Search ................... 525/477; 528/26, 33, 528/32, 41

[56] References Cited

U.S. PATENT DOCUMENTS 4,678,846  7/1987 Weitmeyer et al. .................. 528/32

FOREIGN PATENT DOCUMENTS 0254799  2/1988 European Pat. Off. .
0281681  9/1988 European Pat. Off. .
2602809  7/1976 Fed. Rep. of Germany .
2747233  7/1978 Fed. Rep. of Germany .
3218675  11/1983 Fed. Rep. of Germany .
3426087  3/1986 Fed. Rep. of Germany .

*Primary Examiner*—Melvyn I. Marquis
*Attorney, Agent, or Firm*—Toren, McGeady & Associates

[57] ABSTRACT

A (meth)acrylate ester-modified organopolysiloxane composition, which is composed of several fractions of equilibrated (meth)acrylate ester-modified organopolysiloxanes that differ in the average number of silicon atoms in the mixture of molecules, is disclosed which contains 60 to 95% by weight of a modified organopolysiloxane A having, on the average, 5 to 50 silicon atoms and
5 to 40% by weight of a modified organopolysiloxane B having, on the average, at least 50 silicon atoms, with the proviso that the number of silicon atoms in the average molecule of the modified organopolysiloxane B is at least twice as large as the number of silicon atoms in the average molecule of the modified organopolysiloxane A. The organopolysiloxane mixtures have improved abhesive properties.

4 Claims, No Drawings

(METH)ACRYLATE ESTER-MODIFIED ORGANOPOLYSILOXANES

BACKGROUND OF THE INVENTION

This invention is directed to (meth)acrylate ester-modified organopolysiloxanes composed of several fractions of equilibrated (meth)acrylate ester-modified organopolysiloxanes with differing average numbers of silicon atoms in the mixture of molecules. In particular, the invention is directed to (meth)acrylate ester-modified organopolysiloxane mixtures with improved adhesive properties.

The term (meth)acrylate ester-modified organopolysiloxanes is used to include acrylate ester-modified as well as methacrylate ester-modified organopolysiloxanes.

(Meth)acrylate ester-modified organopolysiloxanes are used to an appreciable extent as abhesive coating compositions. The modified organopolysiloxanes, if necessary in the form of a solution in a suitable solvent, are applied on a support, such as satinized paper and, in the event that solutions of the organopolysiloxanes are used, cured by electron beams after the solvent has evaporated off. The aim is to form a layer which adheres well to the support and cannot be removed from this support even by vigorous rubbing. The layer formed is intended to be abhesive towards adhesives, so that labels or adhesive tapes which are provided with adhesive can be pulled off with the least possible force without losing their own adhesive force in the process.

Suitable (meth)acrylate ester-modified organopolysiloxanes are known. From the many relevant publications and patents, German Patent 2,747,233 is singled out for mentioning. This patent discloses a method for the preparation of organopolysiloxanes modified with (meth)acrylate esters by the reaction of (meth)acrylate esters having —COH groups with organopolysiloxanes which have SiX groups (X=alkoxy, hydroxyl or chloro), optionally in the presence of catalysts. This method is characterized in that the organopolysiloxanes used have the formula

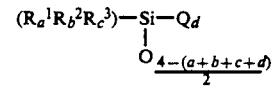

wherein
R$^1$ is an alkyl group with 1 to 4 carbon atoms and/or a phenyl group;
X is a chloro or OR$^2$ group;
R$^2$ is an alkyl group with 1 to 4 carbon atoms and/or hydrogen;
a=1.0 to 2.0;
b=0.02 to 1.6
a+b≦2.66.

The above siloxane molecule contains 3 to 100 silicon atoms and pentaerythritol (meth)acrylate is used as the (meth)acrylate ester. Based on the COH- and SiX-groups, 0.05 moles to equimolar amounts of the pentaerythritol ester are used.

European Publication 0 254 799 discloses compounds of the general formula

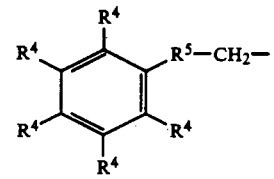

wherein
R$^1$ is a methyl group,
R$^2$ is a linear, branched or cyclic alkyl group with 5 to 18 carbon atoms, which optionally may be substituted by halogen groups,
R$^3$ is an aralkyl of the general formula

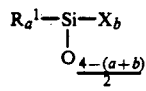

wherein
R$^4$ groups are the same or different and represent hydrogen, alkyl groups with 1 to 12 carbon atoms and halogen,
R$^5$ groups are linear or branched alkylene groups with 1 to 8 carbon atoms,
Q is pentaerythritol, trimethylolethane, trimethylolpropane or glycerin, all the hydroxyl groups except one of which are esterified with (meth)acrylic acid, as well as the dimers of these esters and/or the oxyalkylene derivatives with 1 to 10 oxyethylene and/or oxypropylene units,
a≧0.9,
b, c=0 to 1.1,
b+c≧0.1,
a+b+c=1.8 to 2.2,
d=0.001 to 1.6
a+b+c+d≦3.

These compounds are suitable particularly as abhesive coating compositions or as casting compositions for electronic components.

Further (meth)acrylate ester-modified organopolysiloxanes, which have abhesive properties and are curable by radiation, are disclosed in European Publication 0,281,681. These materials are modified organopolysiloxanes, which are obtainable by the reaction of epoxy-functional polysiloxanes of the general formula

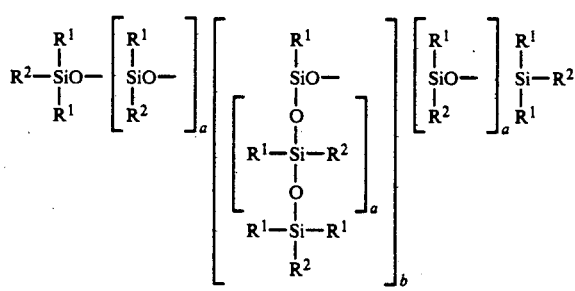

wherein
R$^1$ groups are the same or different lower alkyl groups with 1 to 4 carbon atoms or phenyl groups,
R$^2$ is the same as R$^1$ or denotes the R$^3$ group, up to 70 to 100% of the R$^3$ groups being epoxy-functional groups and up to 30 to 0% of the of the R$^3$ groups being alkyl groups with 2 to 10 carbon atoms or hydrogen groups, with the proviso that at least 1.5 epoxy groups are contained in the average molecule a has a value of 1 to 1,000 b has a value of 0 to 10.

The foregoing compounds are used with such amounts of an acid mixture, comprising 10 to 90 mole % of (meth)acrylic anhydride and 90 to 10 mole % of (meth)acrylic acid, the sum of the two adding up to 100 mole %, that there are 0.8 to 1.9 n acid equivalents for n epoxide equivalents, at elevated temperatures, if necessary in the presence of solvents and conventional esterification catalysts.

A modified organopolysiloxane which is to be used for the preparation of abhesive coatings must meet a series of requirements, some of which are difficult to fulfill. For example, a coating composition must adhere to the substrate, so that it can not be separated by mechanical means from the substrate. An insufficiently adhering coating composition can be removed from the substrate, for example, by rubbing. Moreover, if the adhesion is inadequate, the coating composition is detached partly or completely when the label, which is on the coating composition and is provided with adhesive, is pulled off. In such an eventuality, the adhesive force of the label is reduced or nullified. For this reason, the abhesive coating, when cured, must have adequate strength, so that the coating is not destroyed. Finally, a high abhesiveness towards the supports, such as labels, which are provided with adhesive and are on the coating, is of particular importance. This combination of properties, such as adhesion to the substrate, abhesiveness towards the support that is provided with adhesive and mechanical strength of the cured layer, are difficult to combine in only one (meth)acrylate ester-modified organopolysiloxane. Attempts have therefore already been made to achieve this desired combination of properties by the use of a mixture of (meth)acrylate ester-modified organopolysiloxanes.

The object of the German Patent 3,426,087 which corresponds to U.S. Pat. No. 4,678,846, the two patents hereinafter collectively being referred to as German Patent 3,426,087 are (meth)acrylate ester-modified organopolysiloxane mixtures, which are characterized by an equilibrated organopolysiloxane with, on the average, more than 25 to fewer than 200 silicon atoms, moreover of 2 to 30% by weight of organopolysiloxanes with, on the average, 2 to 25 silicon atoms and of 2 to 30% by weight of organopolysiloxanes with, on the average 200 to 2,000 silicon atoms.

In practice, it has turned out that the reproducible preparation of a mixture consisting of three different (meth)acrylate ester-modified organopolysiloxanes creates difficulties. Inherently, fluctuations always occur in the distribution of the individual components of such preparations and as a result, the property profile of these products is changed. It is difficult and complicated to make compensations for these changes in the mixtures.

SUMMARY OF THE INVENTION

An object of the invention is to provide (meth)acrylate ester-modified organopolysiloxane mixtures with improved abhesive properties which do not have the foregoing disadvantages.

Another object of the invention is to provide (meth)acrylate ester-modified organopolysiloxane mixtures with improved abhesive properties which can be prepared in a more reproducible manner.

A further object of the invention is to reduce the number of components of the (meth)acrylate ester-modified organopolysiloxane mixture.

These objects and others are obtained by means of the invention described below.

Surprisingly, it has now been found that, by adhering to certain selection criteria, the desired combination of properties can be obtained even with a binary system of (meth)acrylate ester-modified organopolysiloxane coating compositions.

According to the invention, (meth)acrylate ester-modified organopolysiloxanes, which contains 60 to 95% by weight of a modified organopolysiloxane A comprising, on the average, 5 to 50 silicon atoms and 5 to 40% by weight of a modified organopolysiloxane B comprising, on the average, at least 50 silicon atoms, with the proviso that the number of silicon atoms in the average molecule of the modified organopolysiloxane B is at least twice as large as the number of silicon atoms in the average molecule of the modified organopolysiloxane A.

DESCRIPTION OF THE INVENTION

From the comparison experiments given in the German Patent 3,426,087, those skilled in the art would have expected that mixtures of only two fractions of (meth)acrylate ester-modified organopolysiloxanes would not lead to usable results. If, for example, modified organopolysiloxanes with an average number of silicon atoms of 10 are mixed with appropriately modified organopolysiloxanes, with the average number of silicon atoms of 120 in the molecule, coatings with inadequate abhesive properties but good adhesion to the substrate are obtained. On the other hand, if (meth)acrylate ester-modified organopolysiloxane containing on the average 120 silicon atoms in the polysiloxane is mixed with those, which contain about 400 silicon atoms in the average siloxane molecule, better abhesive properties are admittedly obtained; however, the adhesion to the substrate and the mechanical strength are inadequate.

In view of the foregoing art, the present invention is particularly surprising and is based on the following discoveries.

The modified organopolysiloxane A, which has, on the average, 5 to 50 silicon atoms in the average molecule, is primarily responsible for the adhesion to the surface of the substrate that is to be coated. This organopolysiloxane A must be present in an amount of 60 to 95% in the mixture.

Preferably, the (meth)acrylate ester-modified polysiloxane mixture contains 70 to 92% by weight of the modified polysiloxane A. The (meth)acrylate ester-modified organopolysiloxane B serves to adjust the mixture so as to endow it with the desired abhesiveness towards the support that is provided with adhesive. This organopolysiloxane B should have at least 50 silicon atoms in the average molecule. In addition, it must, however, fulfill the condition that the number of silicon atoms in the average molecule of the modified organopolysiloxane B is at least twice as large as the number of silicon atoms in the average molecule of the modified organopolysiloxane A.

If the modified organopolysiloxane A has, on the average, 50 silicon atoms, this means that the modified organopolysiloxane B must have, on the average, at least 100 silicon atoms. If the number of silicon atoms in the average molecule of the organopolysiloxane A is 5, the modified organopolysiloxane B must have a minimum of 50 silicon atoms on the average.

This modified organopolysiloxane B is present in the inventive mixture in an amount of 5 to 40% by weight and preferably in an amount of 8 to 30% by weight.

It is assumed that, due to the different chain length of the siloxanes, the inventive mixture of (meth)acrylate ester-modified organopolysiloxanes, before it is cured, separates to some extent in the thin layer on the support, so that the short chain portions of the organopolysiloxane mixture accumulate on the surface of the support.

Additives normally used for the coating composition may be added to the modified organopolysiloxane mixture of the composition of the invention. Such additives are, in particular, free radical starters for the UV curing, such as benzophenone, its oximes or benzoin ethers. If the (meth)acrylate ester-modified organopolysiloxanes are cured by means of electron beams, the addition of special initiators is not required. Further modifying agents that may be used are named in the German Auslegeschrift 2,602,809 and the German Offenlegungsschrift 3,218,675. In addition, solids can be added in order to change the viscosity or the surface. An example of such a solid is, in particular, highly dispersed silica.

Examples of especially suitable (meth)acrylate ester modified organopolysiloxanes are set forth in the following formulas. These examples, which further illustrate the best mode currently contemplated for carrying out the invention, must not be construed as limiting the invention in any manner.

Compound 1

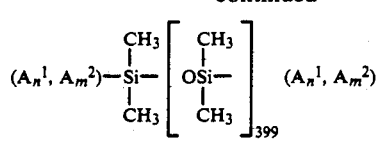

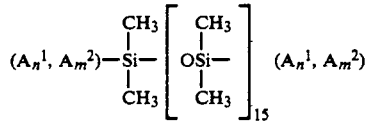

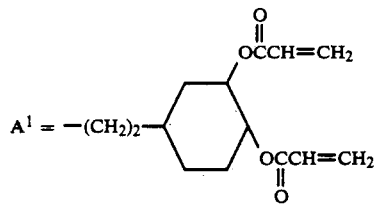

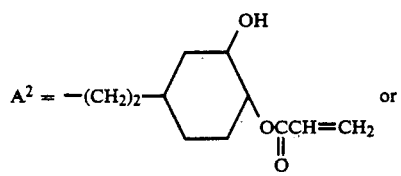

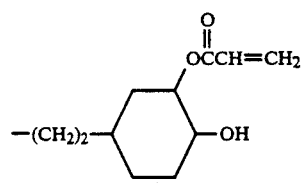

$n = 0.1; m = 0.9$

Compound 2

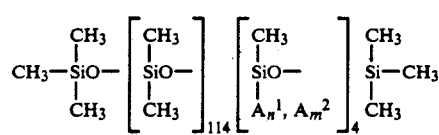

$n = 0.9; m = 0.1$

Compound 3

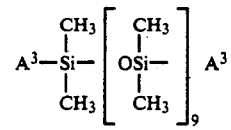

$n = 0.5; m = 0.5$

Compound 4

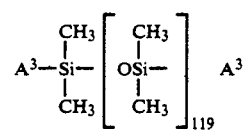

$A^3 = OCH_2-C(CH_2OCCH=CH_2)_3$
                    $\parallel$
                    $O$ Compound 5

These compounds can be synthesized by known method (German Patent 2,747,233 or European Publication 0,281,681).

Especially suitable inventive mixtures of (meth)acrylate ester-modified organopolysiloxanes of the invention are shown in the following Table as a function of the number of silicon atoms in the average molecule.

TABLE 1

| Modified Siloxane | Chain Length | Acrylate Functionality |
|---|---|---|
| A1 | 16 | 2.2 |
| A2 | 20 | 7.5 |
| A3 | 10 | 6 |
| A4 | 40 | 3 |
| B1 | 120 | 3.8 |
| B2 | 400 | 3.8 |
| B3 | 50 | 3 |
| B4 | 400 | 6 |
| B5 | 120 | 6 |

| Inventive Mixtures | A (%) | B (%) |
|---|---|---|
| 1 | 70 A1 | 30 B1 |
| 2 | 90 A1 | 10 B1 |
| 3 | 70 A2 | 30 B1 |
| 4 | 70 A2 | 30 B3 |
| 5 | 80 A3 | 20 B2 |
| 6 | 80 A3 | 20 B1 |
| 7 | 90 A4 | 10 B4 |
| 8 | 60 A2 | 40 B2 |
| 9 | 70 A2 | 30 B2 |
| 10 | 80 A2 | 20 B2 |
| 11 | 90 A2 | 10 B2 |
| 12 | 95 A2 | 5 B2 |
| 13* | 5 A3 | 95 B5 |

*not of the invention

In the following examples, useful properties of different mixtures of (meth)acrylate ester-modified organopolysiloxanes of the invention are demonstrated.

To determine the useful properties of the polysiloxanes modified according to the invention, the products are applied on satinized paper and cured by the action of 1.5 Mrad of electron beams. The amount applied in each case is about 1.1 g./m².

Two different 30 mm. wide adhesives tapes were used for the comparison experiments. One of these, which is coated with an acrylate adhesive, is commercially available under the name of TESA ®A 7475; the other, which is coated with a rubber adhesive, is commercially available under the name of TESA ®K 7476.

To measure the abhesiveness, these adhesive tapes are rolled onto the substrate and subsequently stored at 70° C. in the case of the acrylate adhesive tapes and at 40° C. in the case of the rubber adhesive tapes. After 24 hours, the force is measured, which is required to pull of the adhesive tape from the substrate at a peel angle of 180°. This force is referred to as the release force. Moreover, the adhesion of the modified polysiloxane to the substrate is measured by rubbing vigorously with the thumb. If the coating is too soft, rubber-like crumbs are formed in this so called ruboff test.

To determine the constancy of the release value, the materials provided with the adhesive tapes are kept for 21 days at 70° C. or 40° C. After that time, the release force is determined. If the release force after 21 days of storage differs by more than 100% from the release force after 1 day, then the constancy of the release force is poor. If the deviation is less than 100%, the constancy of the release force is good.

With respect to long term behavior, it is also possible to detect inadequate adhesion of the release coating to the substrate. For this purpose, the materials which are provided with adhesive tapes are stored for 21 days at 70° C. or 40° C. After 21 days, the adhesive tape is pulled off from the substrate at a rate of 30 cm./min. If the adhesion is inadequate, the coating delaminates.

It follows from the following Table 2 that the organopolysiloxane mixtures of the invention have the desired application properties. The inventive mixtures show good adhesion to the support, can be cured rapidly on the support, show good adhesive properties towards adhesives of different chemical structures, show no rub off and the constancy of release values is good.

TABLE 2

| | Release Force (N) | | Rub Off | Delamination | Constancy of Release Value | Comments |
|---|---|---|---|---|---|---|
| | A 7475 | K 7476 | | | | |
| Modified Siloxane | | | | | | |
| A1 | 10 | 9 | no | no | poor | paper tears |
| A2 | 12 | 11 | no | no | poor | paper tears |
| A3 | 12 | 11 | no | no | poor | paper tears |
| A4 | 3 | 2.9 | yes | no | good | |
| B1 | 0.15 | 0.15 | yes | yes | good | |
| B2 | 0.1 | 0.08 | yes | yes | good | |
| B3 | 1.5 | 1.4 | yes | yes | good | |
| B4 | 0.1 | 0.07 | yes | yes | good | |
| B5 | 0.15 | 0.13 | yes | yes | poor | |
| Mixture | | | | | | |
| 1 | 0.3 | 0.3 | no | no | good | |
| 2 | 1.0 | 1.0 | no | no | good | |
| 3 | 0.3 | 0.3 | no | no | good | |
| 4 | 2.5 | 2.3 | no | no | good | |
| 5 | 0.3 | 0.3 | no | no | good | |
| 6 | 0.4 | 0.5 | no | no | good | |
| 7 | 0.05 | 0.01 | no | no | good | |
| 8 | 0.1 | 0.08 | no | no | good | |
| 9 | 0.1 | 0.1 | no | no | good | |
| 10 | 0.2 | 0.2 | no | no | good | |
| 11 | 0.3 | 0.3 | no | no | good | |
| 12 | 0.5 | 0.4 | no | no | good | |
| 13* | 0.2 | 0.15 | no | yes | poor | |

*not of the invention

We claim:

1. A (meth)acrylate ester-modified organopolysiloxane composition composed of several fractions of equilibrated (meth)acrylate ester-modified organopolysiloxanes that differ in the average number of silicon atoms in the mixture of molecules, comprising a mixture of
   60 to 95% by weight of a modified organopolysiloxane A having, on the average, 5 to 50 silicon atoms and
   5 to 40% by weight of a modified organopolysiloxane B having, on the average, at least 50 silicon atoms, with the proviso that the number of silicon atoms in the average molecule of the modified organopolysiloxane B is at least twice as large as the number of silicon atoms in the average molecule of the modified organopolysiloxane A.

2. The (meth)acrylate ester-modified organopolysiloxane composition of claim 1, which comprises
   70 to 92% by weight of organopolysiloxane A and
   8 to 30% by weight of organopolysiloxane B.

3. An abhesive coating composition containing an abhesively effective amount of the mixture of claim 1.

4. An abhesive coating composition containing an abhesively effective amount of the mixture of claim 2.

* * * * *